(12) United States Patent
Watanabe et al.

(10) Patent No.: US 11,272,707 B2
(45) Date of Patent: Mar. 15, 2022

(54) LIQUID COMPOSITION COMPRISING MEFENTRIFLUCONAZOLE

(71) Applicant: SUMITOMO CHEMICAL COMPANY, LIMITED, Tokyo (JP)

(72) Inventors: Atsushi Watanabe, Takarazuka (JP); Yoshinao Sada, Kasai (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/319,417

(22) Filed: May 13, 2021

(65) Prior Publication Data

US 2021/0259248 A1 Aug. 26, 2021

Related U.S. Application Data

(63) Continuation of application No. 16/914,000, filed on Jun. 26, 2020, now Pat. No. 11,033,030, which is a continuation-in-part of application No. 16/507,593, filed on Jul. 10, 2019, now abandoned.

(30) Foreign Application Priority Data

May 31, 2019 (JP) .............................. JP2019-102243

(51) Int. Cl.
  *A01N 43/653* (2006.01)
  *A01N 25/02* (2006.01)
  *A01N 25/30* (2006.01)
(52) U.S. Cl.
  CPC ........... *A01N 43/653* (2013.01); *A01N 25/02* (2013.01); *A01N 25/30* (2013.01)
(58) Field of Classification Search
  CPC ....... A01N 43/653; A01N 25/02; A01N 25/30
  See application file for complete search history.

(56) References Cited

U.S. PATENT DOCUMENTS

| | | | | |
|---|---|---|---|---|
| 5,116,408 A | * | 5/1992 | Crozer | C09D 15/00 106/31.01 |
| 11,033,030 B2 | * | 6/2021 | Watanabe | A01N 25/30 |
| 2014/0155262 A1 | * | 6/2014 | Dietz | C07C 43/263 504/100 |
| 2016/0360748 A1 | | 12/2016 | Pawlak, II et al. | |
| 2018/0271093 A1 | | 9/2018 | Nishimura et al. | |

FOREIGN PATENT DOCUMENTS

| | | |
|---|---|---|
| CN | 106359395 A | 2/2017 |
| CN | 108541711 A | 9/2018 |
| CN | 109548791 A | 4/2019 |
| EP | 2839745 A1 | 2/2015 |
| WO | WO 2013/007767 A1 | 1/2013 |
| WO | WO 2017/102905 A1 | 2/2017 |
| WO | WO 2017/061483 A1 | 4/2017 |

OTHER PUBLICATIONS

Wang et al. in CN 107593717 A, Jan. 19, 2018 Eng Trans from PE2E (Year: 2018).*
Authors Disclosed Anonymously, "IP.com Journal", IP.com, Jan. 12, 2017, Formulation 149-151, No. IPCOM000248802D, 16 pages.
DeBoer, "Use of Uptake Spraying Oil to Improve Fungicidal Avtivity of the Triazole Fungicide Fenbuconazole on Puccinia triticina and Puccinia striiformis Rusts of Wheat," Plant Health Progress, May 28, 2013, 9 pages.
English Translation of the Written Opinion of the International Searching Authority, dated Aug. 25, 2020, for International Application No. PCT/JP2020/021218.
Helena Holding Company, "AGRI-DEX: A Crop Oil Concentrate," Safety Label, 2014, 2 pages.
International Search Report, dated Aug. 25, 2020, for International Application No. PCT/JP2020/021218.
Somervaille et al., "Adjuvants: Oils, surfactants and other additives for farm chemicals," GRDC, 2012, pp. 1-48 (52 pages total).

* cited by examiner

*Primary Examiner* — Blessing M Fubara
(74) *Attorney, Agent, or Firm* — Birch, Stewart, Kolasch & Birch, LLP

(57) ABSTRACT

An object of the present invention is to provide a composition which is excellent in plant disease control effect without causing significant injury to the plants. A liquid composition comprising mefentrifluconazole, a Nonionic Surfactant (NIS), and water, wherein the weight ratio of mefentrifluconazole to the NIS is in the range of 1:0.1 to 1:10.

2 Claims, No Drawings

LIQUID COMPOSITION COMPRISING MEFENTRIFLUCONAZOLE

CROSS REFERENCE TO RELATED APPLICATIONS

This application is a Continuation application of co-pending application Ser. No. 16/914,000, filed on Jun. 26, 2020, which is a Continuation-in-Part of U.S. application Ser. No. 16/507,593, filed on Jul. 10, 2019, which claims the benefit under 35 U.S.C. § 119(a) to Application No. 2019-102243, filed in Japan on May 31, 2019, all of which are hereby expressly incorporated by reference into the present application.

BACKGROUND OF THE INVENTION

Field of the Invention

The present invention relates to a liquid composition for controlling plant diseases without causing significant injury to the plants, which comprises mefentrifluconazole.

Description of the Related Art

Conventionally, mefentrifluconazole is known as an active ingredient for a plant disease control agent (for example, refer to US 2014/0155262 and WO 2017/102905).

CITATION LIST

Patent Documents

Patent Document 1: US-2014-0155262-A1.
Patent Document 2: WO 2017/102905-A1

SUMMARY OF THE INVENTION

An object of the present invention is to provide a composition which is excellent in plant disease control effect without causing significant injury to the plants.

The present inventors have intensively studied so as to find a composition excellent in plant disease control effect without causing significant injury to the plants, and found that a liquid composition comprising mefentrifluconazole, NIS, and water and having a concentration of NIS within a specific range shows a synergistic effect and is excellent in plant disease control effect without causing significant injury to the plants.

More specifically, the present invention is as described below.
[1] A liquid composition comprising mefentrifluconazole, a Nonionic Surfactant (NIS), and water, wherein the weight ratio of mefentrifluconazole to the NIS is in the range of 1:0.1 to 1:10.
[2] The liquid composition according to [1], wherein the NIS is NIS containing at least one nonionic surfactant selected from the group consisting of fatty alcohol alkyloxylates, polyoxyalkylene esters of fatty acids, alkylaryl alkoxylates, alkylarylpolyoxyalkylene glycols, and organosilicones.
[3] A method for controlling plant diseases, comprising the steps of mixing a mefentrifluconazole-containing formulation, an NIS, and water to prepare a liquid composition comprising mefentrifluconazole, the NIS, and water, wherein the weight ratio of mefentrifluconazole to the NIS is in the range of 1:0.1 to 1:10; and applying the liquid composition to a plant or soil for cultivating the plant.

Plant diseases can be controlled according to the present invention.

DETAILED DESCRIPTION OF THE PREFERRED EMBODIMENTS

The liquid composition according to the present invention (hereinafter referred to as the composition of the present invention) comprises mefentrifluconazole.

Mefentrifluconazole is a known compound and described, for example, in US Patent Application Publication No. 2014/0155262 A and WO 2017/102905. Mefentrifluconazole can be synthesized by the method as described in US Patent Application Publication No. 2014/0155262 A and WO 2017/102905.

The concentration of mefentrifluconazole in the composition of the present invention is usually 100 to 2000 ppm, preferably 150 to 1800 ppm, more preferably 300 to 1700 ppm, and most preferably 500 to 1500 ppm. Specific concentrations of mefentrifluconazole includes 200 ppm, 400 ppm, 600 ppm, 800 ppm, 1000 ppm, and 1200 ppm.

The composition of the present invention comprises NIS. In general, NIS is known as an adjuvant classified as Nonionic Surfactants (NIS). Also, adjuvants are generally known as substances to be added to enhance the action of pesticides or to modify the physical properties of mixtures for spraying (spray liquid). The NIS, as used herein, means adjuvants containing a nonionic surfactant as a main ingredient, and specifically refers to adjuvants containing at least 60% by weight of a nonionic surfactant. Examples of the nonionic surfactant contained in the NIS include fatty alcohol alkoxylates, polyoxyalkylene esters of fatty acids, esters of polyhydric alcohols and fatty acids, polyoxyethylene sorbitan fatty acid esters, anhydrohexitol fatty acid esters, alkylpolyglycosides, alkylaryl alkoxylates, alkylarylpolyoxyalkylene glycols, polyoxyethylene polyoxypropylene block copolymers, alkanolamides type surfactants, amine oxide type surfactants, fatty amine alkoxylates, ethoxylated alkyl phosphate esters, and organosilicone surfactants such as dimethyl siloxanes, polyethoxylated dimethyl siloxanes and their derivatives. The NIS containing at least one nonionic surfactant selected from the group consisting of fatty alcohol alkyloxylates, polyoxyalkylene esters of fatty acids, alkylaryl alkoxylates, alkylarylpolyoxyalkylene glycols, and organosilicones is preferred as the NIS. Examples of commercially available NIS include Activator 90 (manufactured by Loveland), APSA-80 (manufactured by Amway), ChemSurf 90 (manufactured by United Suppliers), Cornbelt Premier 90 (manufactured by West Central), Induce (manufactured by Helena), Liberate LeciTech (manufactured by Loveland), Pen-A-trate II (manufactured by Precision Laboratories), Prefer 90 (manufactured by West Central), Preference (manufactured by Winfield), Protyx (manufactured by Precision Laboratories), Purity 100 (manufactured by Rosens), R-11 (manufactured by Wilbur-Ellis), Translate (manufactured by United Suppliers), and Wet-Sol 99 (manufactured by Schaeffers).

The composition of the present invention comprises NIS in an amount of usually 0.1 to 0.5% by volume, preferably 0.1 to 0.15% by volume, and most preferably 0.125, by volume. Specific percentages by volume of NIS includes, 0.2%, 0.3%, and 0.4. The weight ratio of mefentrifluconazole to NIS in the composition of the present invention is preferably in the range of 1:0.1 to 1:100, 1:0.9 to 1:33 or 1:1 to 1:10.

The composition of the present invention comprises water. As the water, water generally used to prepare a mixture for spraying in ordinary pesticide spraying is used.

The composition of the present invention is prepared by mixing a mefentrifluconazole-containing formulation, NIS, and water. The formulation type of the mefentrifluconazole-containing formulation may be any formulation type as long as the formulation is generally mixed with water to prepare a mixture for spraying (spray liquid) so that the mixture is sprayed. Examples of such formulation types include emulsifiable concentrates, wettable powders, water dispersible granules, and SC (suspension concentrates), and SC are preferred. The mefentrifluconazole-containing formulation car be prepared by methods known per se for the preparation of pesticide formulations, for example by mixing mefentrifluconazole, inert carriers, and surfactants, and, optionally further other auxiliary agents for formulation.

Examples of the inert carriers used in the preparation of the mefentrifluconazole-containing formulation include solid carriers and liquid carriers. Examples of solid carriers include mineral fine powder. Examples of liquid carriers include organic solvents and water. Examples of the surfactants include anionic surfactants, nonionic surfactants, and cationic surfactants. Examples of other auxiliary agents for formulation include thickeners, preservatives, and colorants.

The composition of the present invention is prepared by adjusting the amounts of the mefentrifluconazole-containing formulation, NIS, and water, such that each of the concentrations of mefentrifluconazole and NIS in the composition of the present invention falls within the above ranges, and mixing them.

The composition of the present invention may further comprise one or more other fungicides and/or insecticides, and the mefentrifluconazole-containing formulation may comprise fungicides and/or insecticides other than mefentrifluconazole.

Plant diseases can be controlled by applying the composition of the present invention to a plant or soil for cultivating the plant.

Examples of the plant diseases that can be controlled by the present invention include the following plant diseases.

Rice diseases: blast (*Magnaporthe grisea*), brown spot (*Cochliobolus miyabeanus*), sheath blight (*Rhizoctonia solani*), and bakanae disease (*Gibberella fujikuroi*);

Wheat diseases: powdery mildew (*Erysiphe graminis*), fusarium Head blight (*Fusarium graminearum, F. avenaceum, F. culmorum, Microdochium nivale*), rust (for example, yellow rust (*Puccinia striiformis*), black rust (*P. graminis*), Brown rust (*P. recondita*)), snow mold (*Microdochium nivale*), typhula snow blight (*Typhula* sp.), loose smut (*Ustilago tritici*), stinking smut (*Tilletia caries*), eyespot (*Pseudocercosporella herpotrichoides*), Septoria leaf blotch (*Mycosphaerella graminicola*), glume blotch (*Stagonospora nodorum*), and tan spot (*Pyrenophora tritici-repentis*);

Barley diseases: powdery mildew (*Erysiphe graminis*), loose smut (*Fusarium graminearum, F. avenaceum, F. culmorum, Microdochium nivale*), rust (*Puccinia striiformis, P. graminis, P. hordei*), loose smut (*Ustilago nuda*), scald (*Rhynchosporium secalis*), net blotch (*Pyrenophora teres*), spot blotch (*Cochliobolus sativus*), leaf stripe (*Pyrenophora graminea*), and damping-off caused by *rhizoctonia* fungus (*Rhizoctonia solani*);

Corn diseases: smut (*Ustilago maydis*), southern leaf blight (*Cochliobolus heterostrophus*), zonate leaf spot (*Gloeocercospora sorghi*), southern rust (*Puccinia polysora*), gray leaf spot (*Cercospora zeae-maydis*), and damping-off caused by *rhizoctonia* fungus (*Rhizoctonia solani*);

Citrus diseases: melanose (*Diaporthe citri*), scab (*Elsinoe fawcetti*), and fruit rot (*Penicillium digitatum, P. italicum*);

Apple diseases: blossom blight (*Monilinia mali*), canker (*Valsa ceratosperma*), powdery mildew (*Podosphaera leucotricha*), Alternaria leaf spot (*Alternaria alternata* apple pathotype), scab (*Venturia inaequalis*), and bitter rot (*Colletotrichum acutatum*);

Pear diseases: scab (*Venturia nashicola, V. pirina*), black spot (*Alternaria alternata* Japanese pear pathotype), rust (*Gymnosporangium haraeanum*), and brown spot (*Stemphilium vesicarium*);

Peach diseases: brown rot (*Monilinia fructicola*), scab (*Cladosporium carpophilum*), and *Phomopsis* rot (*Phomopsis* sp.);

Grapes diseases: anthracnose (*Elsinoe ampelina*), ripe rot (*Glomerella cingulata*), powdery mildew (*Uncinula necator*), rust (*Phakopsora ampelopsidis*), and black rot (*Guignardia bidwellii*);

Diseases of Japanese persimmon: anthracnose (*Gloeosporium kaki*), and leaf spot (*Cercospora kaki, Mycosphaerella nawae*);

Diseases of Cucurbitaceae: anthracnose (*Colletotrichum lagenarium*), powdery mildew (*Sphaerotheca fuliginea*), gummy stem blight (*Mycosphaerella melonis*), and Fusarium wilt (*Fusarium oxysporum*);

Tomato diseases: early blight (*Alternaria solani*), and leaf mold (*Cladosporium fulvum*);

Eggplant disease: brown spot (*Phomopsis vexans*), and powdery mildew (*Erysiphe cichoracearum*);

Diseases of *brassica* plants: Alternaria leaf spot (*Alternaria japonica*), white spot (*Cercosporella brassicae*), and clubroot (*Plasmodiophora brassicae*);

Welsh onion diseases: rust (*Puccinia allii*),

Soybean diseases: purple stain (*Cercospora kikuchii*), Sphaceloma scad (*Elsinoe glycines*), pod and stem blight (*Diaporthe phaseolorum* var. *sojae*), septoria brown spot (*Septoria glycines*), Cercospora leaf spot (*Cercospora sojina*), rust (*Phakopsora pachyrhizi*), damping-off caused by *rhizoctonia* fungus (*Rhizoctonia solani*), target spot (*Corynespora casiicola*), and *sclerotinia* rot (*Sclerotinia sclerotiorum*);

Kidney bean diseases: anthracnose (*Colletotrichum lindemthianum*);

Peanut diseases: leaf spot (*Cercospora personata*), brown leaf spot (*Cercospora arachidicola*), and southern blight (*Sclerotium rolfsii*);

Garden pea diseases: powdery mildew (*Erysiphe pisi*);

Potato diseases: early blight (*Alternaria solani*), pink rot (*Phytophthora erythroseptica*), and powdery scab (*Spongospora subterranean* f. sp. *subterranea*);

Strawberry diseases: powdery mildew (*Sphaerotheca humuli*), and anthracnose (*Glomerella cingulata*);

Tea diseases: net blister blight (*Exobasidium reticulatum*), white scab (*Elsince leucospila*), gray blight (*Pestalotiopsis* sp.), and anthracnose (*Colletotrichum theae-sinensis*);

Tobacco diseases: brown spot (*Alternaria longipes*), powdery mildew (*Erysiphe cichoracearum*), and anthracnose (*Colletotrichum tabacum*);

Rape seed diseases: *sclerotinia* rot (*Sclerotinia sclerotiorum*), and rape seed damping-off caused by *Rhizoctonia solani*. (*Rhizoctonia solani*);

Cotton diseases: cotton damping-off caused by *Rhizoctonia solani* (*Rhizoctonia solani*);

Sugar beet diseases: *cercospora* leaf spot (*Cercospora beticola*), leaf blight (*Thanatephorus cucumeris*), root rot (*Thanatephorus cucumeris*), and *aphanomyces* root rot (*Aphanomyces cochlioides*);

Rose diseases: blackspot (*Diplocarpon rosae*), and powdery mildew (*Sphaerotheca pannosa*);

Diseases of *chrysanthemum* and Asteraceae plants: leaf blight (*Septoria chrysanthemi-indici*), and white rust (*Puccinia horiana*);

Various plants diseases: Gray mold (*Botrytis cinerea*), and *Sclerotinia* rot (*Sclerotinia sclerotiorum*);

Japanese radish diseases: *Alternaria* leaf spot (*Alternaria brassicicola*);

Turfgrass diseases: dollar spot (*Sclerotinia homeocarpa*), brown patch, and large patch (*Rhizoctonia solani*);

Banana diseases: Sigatoka disease (*Mycosphaerella fijiensis, Mycosphaerelia musicola*);

Seed diseases or diseases in the early stages of the growth of various plants caused by bacteria of *Aspergillus* spp., *Penicillium* spp., *Fusarium* spp., *Gibberella* spp., *Tricoderma* spp., *Thielaviopsis* spp., *Rhizopus* spp., *Mucor* spp., *Corticium* spp., *Phoma* spp., *Rhizoctonia* spp., *Diplodia* spp.; and Viral diseases of various plants mediated by *Polymixa* spp. or *Olpidium* spp.

Examples of plants to which the composition of the present invention can be applied include the following plants.

Crops: corn, rice, wheat, barley, rye, oat, sorghum, cotton, soybean, azuki bean, kidney bean, peanut, buckwheat, sugar beet, rapeseed, sunflower, sugar cane, tobacco, and the others;

Vegetables: Solanaceous vegetables (for example, eggplant, tomato, green pepper, hot pepper, or potato), Cucurbitaceous vegetables (for example, cucumber, pumpkin, zucchini, watermelon, melon, or squash), Cruciferous vegetables (for example, Japanese radish, white turnip, horseradish, kohlrabi, Chinese cabbage, cabbage, leaf mustard, broccoli, or cauliflower), Asteraceous vegetables (for example, burdock, garland chrysanthemum, artichoke, or lettuce), Liliaceous vegetables (for example, welsh onion, onion, garlic, or asparagus), Ammiaceous vegetables (for example, carrot, parsley, celery, or parsnip), Chenopodiaceous vegetables (for example, spinach, or Swiss chard), Lamiaceous vegetables (for example, perilla, mint, or basil), strawberry, sweet potato, glutinous yam, eddo, and the others;

Flowers;

Foliage plants;

Turfgrass;

Fruits: pomaceous fruits (for example, apple, common pear, Japanese pear, Chinese quince, or quince), stone fleshy fruits (for example, peach, plum, nectarine, Japanese apricot (*Prunus mume*), cherry fruit, apricot, or prune), citrus plants (for example, Citrus unshiu, orange, lemon, lime, or grapefruits), nuts (for example, chestnuts, walnuts, hazel nuts, almond, pistachio, cashew nuts, or macadamia nuts), berry fruits (for example, blueberry, cranberry, blackberry, or raspberry), grapes, Japanese persimmon, olive, loquat, banana, coffee, date palm, coconuts, and the others; and Trees other than fruit trees: tea, mulberry, flowering plants, street trees (for example, ash tree, birch, dogwood, eucalyptus, ginkgo (*Ginkgo biloba*), lilac, maple tree, oak (quercus), poplar, cercis, Formosan gum (*Liquidambar formosana*), plane tree, zelkova, Japanese arborvitae (*Thuja standishii*), Japanese fir, hemlock, juniper, pinus, spruce, or yew (*Taxus cuspidate*)), and the others.

Also, the plants may be plants provided with tolerance by gene recombination technology.

The method for controlling plant diseases according to the present invention (hereinafter referred to as the method of the present invention) includes the steps of: mixing a mefentrifluconazole-containing formulation, NIS, and water to prepare the composition of the present invention; and applying the composition of the present invention to a plant or soil for cultivating the plant. The step of preparing the composition of the present invention is performed by the method described above. The step of applying the composition of the present invention is carried out by ground application or aerial application. In the step of applying the composition of the present invention, the composition of the present invention is applied with a ground sprayer, an aerial equipment or through a sprinkler irrigation equipment.

The application rate of the composition of the present invention in the method of the present invention may be varied depending on a type of plant, a type or a frequency of an occurrence of plant diseases to be controlled, a formulation type, an application period, an application method, an application site, a climate condition and the like. The application rate of the composition of the present invention is usually 10 to 100 g per hectare as an amount of mefentrifluconazole.

EXAMPLES

Hereinafter, the present invention will be described in more detail by test examples.

Formulation Example

Ten (10) parts by weight of mefentrifluconazole, 6 parts by weight of a mixture of 40% polyoxyethylene tristyryl phenyl ether phosphate and 60%<propylene glycol (SOPROPHOR FLK, manufactured by Solvay), 0.2 parts by weight of silicone-based antifoaming agent (XIAMETER ACP-1500, manufactured by Toray Dow Corning), and 70.5 parts by weight of ion-exchanged water were mixed to obtain a mixture. The mixture and beads twice the weight of the mixture were placed in a container and then the container was set into a planetary centrifugal mixer (Awatori Rentaro, manufactured by THINKY CORPORATION) and the mixture was stirred for wet grinding, thereby obtaining 86.7 parts by weight of a suspension. 0.2 parts by weight of xanthan gum (KELZAN S, manufactured by CP Kelco), 0.4 parts by weight of magnesium aluminum silicate (VEEGUM R, manufactured by R. T. Vanderbilt Company, Inc.), 5 parts by weight of propylene glycol (manufactured by Adeka), and 7.7 parts by weight of ion-exchanged water were mixed to obtain 13.3 parts by weight of a thickener-containing liquid.

86.7 parts by weight of the suspension and 13.3 parts by weight of the thickener-containing liquid were mixed to obtain SC comprising 10% by weight of mefentrifluconazole (hereinafter referred to as mefentrifluconazole SC).

Test Example 1

Liquid compositions comprising 150 ppm of mefentrifluconazole, 0.1 or 0.5% by volume of NIS and water (hereinafter referred to as Present Compositions 1 and 2) were prepared by diluting mefentrifluconazole SC and NIS (Induce, containing alkylaryl alkoxylates, alkanolamides, dimethyl siloxane, and fatty acids in a total amount of 901, or more, content of nonionic surfactant is 70, manufactured by Helena), respectively, with water and mixing them. Similarly, mefentrifluconazole SC and NIS were each diluted with water to prepare a liquid composition comprising 150 ppm of mefentrifluconazole and water (hereinafter referred to as Comparative Composition 1), a liquid composition comprising 0.1% by volume of NIS and water (hereinafter referred to as Comparative Composition 2), and a liquid composition comprising 0.5% by volume of NIS and water (hereinafter referred to as Comparative Composition 3), respectively.

A soil was filled into a plastic pot, and wheat (variety: Shirogane) was seeded therein, and grown in a greenhouse for 10 days. The prepared liquid compositions were each sprayed to the foliage of wheat such that the application rate would be 200 L/ha. After spraying, the plant was air-dried, and an aqueous suspension of spores of Brown rust. (*P. recondita*) was inoculated by spraying it. After inoculating, the plant was placed at 23° C. under high humidity for 1 day and subsequently placed under illumination for 10 days, then the lesion area was investigated (lesion area in the treated area).

On the other hand, in the non-treated area, the same operation as in the treated area was carried out except that the liquid composition was not sprayed, and the lesion area of Brown rust in the non-treated area was investigated (lesion area in the non-treated area).

From the lesion area in each of the treated area and the non-treated area, the efficacy of the treated area was determined according to the following "Formula 1".

The results are indicated in Table 1.

Efficacy (%)=[1−(lesion area in the treated area/lesion area in the non-treated area)]×100    Formula (1):

TABLE 1

|  | Concentration of mefentrifluconazole in composition (ppm) | Concentration of NIS in composition (% by volume) | Efficacy (%) |
| --- | --- | --- | --- |
| Present Composition 1 | 150 | 0.1 | 100 |
| Present Composition 2 | 150 | 0.5 | 100 |
| Comparative Composition 1 | 150 | — | 60 |
| Comparative Composition 2 | — | 0.1 | 0 |
| Comparative Composition 3 | — | 0.5 | 0 |

Test Example 2

Liquid compositions comprising 500 or 1000 ppm of mefentrifluconazole, 0.1 or 0.5% by volume of NIS and water (hereinafter referred to as Present Composition 3, Present Composition 4, Present Composition 5, and Present Composition 6) were prepared by diluting mefentrifluconazole SC and NIS (Induce, containing alkylaryl alkoxylates, alkanolamides, dimethyl siloxane, and fatty acids in a total amount of 90% or more, content of nonionic surfactant is 70%, manufactured by Helena), respectively, with water and mixing them. Similarly, mefentrifluconazole SC was alone diluted with water to prepare a liquid composition comprising 500 or 1000 ppm of mefentrifluconazole and water (hereinafter referred to as Comparative Composition 4 and Comparative Composition 5).

A soil was filled into a plastic pot, and wheat (variety: Apogee) was seeded therein, and grown in a greenhouse for 45 days, and an aqueous suspension of spores of *Septoria tritici* was inoculated by spraying it. After spraying, the plant was placed at 15° C. under high humidity for 1 day and subsequently placed under illumination for 6 days. The prepared liquid compositions were each sprayed to the foliage of wheat such that the application rate would be 100 L/ha. The sprayed plant was placed for further 17 days, then the lesion area was investigated (lesion area in the treated area).

On the other hand, in the non-treated area, the same operation as in the treated area was carried out except that the liquid composition was not sprayed, and the lesion area of *Septoria tritici* in the non-treated area was investigated (lesion area in the non-treated area).

From the lesion area in each of the treated area and the non-treated area, the efficacy of the treated area was determined according to the above "Formula 1".

The results are indicated in Table 2.

TABLE 2

|  | Concentration of mefentrifluconazole in composition (ppm) | Concentration of NIS in composition (% by volume) | Efficacy (%) |
| --- | --- | --- | --- |
| Comparative Composition 4 | 500 | — | 7 |
| Present Composition 3 | 500 | 0.1 | 53 |
| Present Composition 4 | 500 | 0.5 | 46 |
| Comparative Composition 5 | 1000 | — | 3 |
| Present Composition 5 | 1000 | 0.1 | 52 |
| Present Composition 6 | 1000 | 0.5 | 74 |

What is claimed is:

1. A liquid composition comprising mefentrifluconazole and propylene glycol, wherein the weight ratio of mefentrifluconazole to propylene glycol is in the range of from 1:0.36 to 1:0.86.

2. A method for controlling plant diseases comprising a step of applying the liquid composition according to claim 1 to a plant or soil for cultivating the plant.

* * * * *